United States Patent [19]
Morikami

[11] Patent Number: 6,119,653
[45] Date of Patent: Sep. 19, 2000

[54] ENGINE RUNNING CONTROL APPARATUS FOR AN OUTBOARD MOTOR

[75] Inventor: Tadaaki Morikami, Hamamatsu, Japan

[73] Assignee: Suzuki Motor Corporation, Shizuoka-ken, Japan

[21] Appl. No.: 09/356,776

[22] Filed: Jul. 16, 1999

[30] Foreign Application Priority Data

Jul. 30, 1998 [JP] Japan ................................. 10-216182

[51] Int. Cl.$^7$ .................................................. F02D 41/08
[52] U.S. Cl. ...................... 123/339.23; 123/327; 123/585
[58] Field of Search .............................. 123/339.23, 327, 123/493, 585

[56] References Cited

U.S. PATENT DOCUMENTS

| | | | |
|---|---|---|---|
| 4,526,144 | 7/1985 | Hasegawa et al. | 123/327 X |
| 4,700,674 | 10/1987 | Iwata | 123/327 |
| 4,788,954 | 12/1988 | Otobe et al. | 123/327 |
| 4,870,933 | 10/1989 | Mizuno | 123/327 X |
| 5,213,076 | 5/1993 | Umemoto et al. | 123/327 |
| 5,261,368 | 11/1993 | Umemoto | 123/327 |

*Primary Examiner*—Tony M. Argenbright
*Attorney, Agent, or Firm*—Darby & Darby

[57] ABSTRACT

An engine running control apparatus includes a full-closure state detecting device for outputting a full-closure detection signal when the throttle valve is in the fully closed state, a control device for controlling the open degree of the air control valve, a time-measuring device for counting up a predetermined period of time in response to the full-closure detection signal, an engine speed detecting device for detecting the rotating speed of the engine and an initial value setting device for setting up an engine speed at which control of the degree of the opening is started by the control device, in response to the full-closure detection signal. In this configuration, the control device, in response to the reception of the full-closure detecting signal, fixes the opening of the air control valve until the time-measuring device counts up to a predetermined period of time, and controls the opening of the air control valve after the elapse of the predetermined time so that the engine speed will be reduced at a predetermined rate over time.

3 Claims, 7 Drawing Sheets

ENGINE RUNNING CONTROL APPARATUS FOR AN OUTBOARD MOTOR

BACKGROUND OF THE INVENTION

(1) Field of the Invention

The present invention relates to an engine running control apparatus for an outboard motor, and detailedly relates to an engine running control apparatus for controlling an outboard motor so as to prevent abrupt lowering of the engine speed thereof.

(2) Description of the Prior Art

In control of an outboard motor, when the throttle is closed abruptly while the engine is running so as to completely close the throttle valve, the engine speed lowers sharply and hence the engine may stall. To eliminate such inconveniences, spark-advance control (which is the control of delaying the ignition retard) has been carried out conventionally, so as to perform gradual reduction of the engine speed, that is, a so-called tailing, to thereby prevent the engine from stalling and to improve sailing comfortableness.

Also, in order to prevent the throttle valve from being closed abruptly, a mechanical dashpot for mechanically delaying the closing timing of the throttle valve has been attached.

However, the conventional technique of performing spark-advance control is not capable of providing the engine with a high enough torque, producing difficulties in reducing the engine speed without compromising sailing comfortableness. This problem was especially marked for four-cycle engines.

When a mechanical dashpot is used, it is difficult to match the delay action of the closing angle time from the dashpot with the action of the air control valves used for EFI and the like, which causes the engine rotation to hunt and results in an unstable operation.

SUMMARY OF THE INVENTION

The present invention has been devised in view of the above prior art problems and it is therefore an object of the invention to provide an engine running control apparatus for an outboard motor which, even when the throttle is abruptly closed and the throttle valve is abruptly set to a fully closed state, can lower the engine speed appropriately without causing the engine to stall etc., realizing a comfortable sailing performance.

In order to achieve the above object, the present invention is configured as follows:

The first aspect of the present invention resides in an engine running control apparatus for an outboard motor comprising: an engine as a rotational driving source of a propeller shaft; a throttle valve disposed in an air intake passage connected to the engine; an air supplying channel disposed upstream of the throttle valve for supplying air to the air intake passage; and an air control valve for controlling air from the air supplying channel, wherein the engine speed is controlled by controlling air supplied from the air supplying channel by means of the air control valve. In this engine running control apparatus, the engine running control apparatus comprises:

a full-closure state detecting means for outputting a full-closure detection signal when the throttle valve is in the fully closed state;

a control means for control the open degree of the air control valve;

a time-measuring means for counting up a predetermined period of time in response to the full-closure detection signal;

an engine speed detecting means for detecting the rotating speed of the engine; and an initial value setting means for setting up an engine speed at which control of the degree of the opening is started by the control means, in response to the full-closure detection signal, and is characterized in that the control means, in response to the reception of the full-closure detecting signal, fixes the degree of the opening of the air control valve until the time-measuring means counts up to a predetermined period of time, and controls the opening of the air control valve after the elapse of the predetermined time so that the engine speed will be reduced at a predetermined rate over time.

In accordance with the second aspect of the present invention, the engine running control apparatus for an outboard motor having the above first feature is characterized in that the control means controls the degree of the opening of the air control valve so as to keep the reduction in engine speed per unit time constant.

In accordance with the third aspect of the present invention, the engine running control apparatus for an outboard motor having the above first feature is characterized in that the control means controls the degree of the opening of the air control valve so as to change the reduction in engine speed per unit time stepwise.

In the present invention thus configured, when the operator abruptly closes the throttle and hence the throttle valve is quickly brought into the fully closed state, the full-closure detecting means outputs a full-closure signal, based on which the control means fixes the degree of the opening of the air control valve and keeps on the fixed state until the time for the fixed state reaches the previously determined time. In this while, the initial value setting means sets up the engine speed (the initial engine speed) at which the control of the opening is started. The control means starts to control the open degree of the air control valve when the engine speed has reached the initial engine speed after the lapse of the predetermined time and gradually reduces the engine speed at the predetermined rate over time down to the predetermined target engine speed. Therefore, the present invention can reliably prevent the engine from stalling, and hence is effective in easy running control as well as markedly contributes to improvement of sailing comfortableness.

DESCRIPTION OF THE PREFERRED EMBODIMENTS

The embodiment of the present invention will hereinafter be described in detail with reference to the accompanying drawings.

Figure 1:
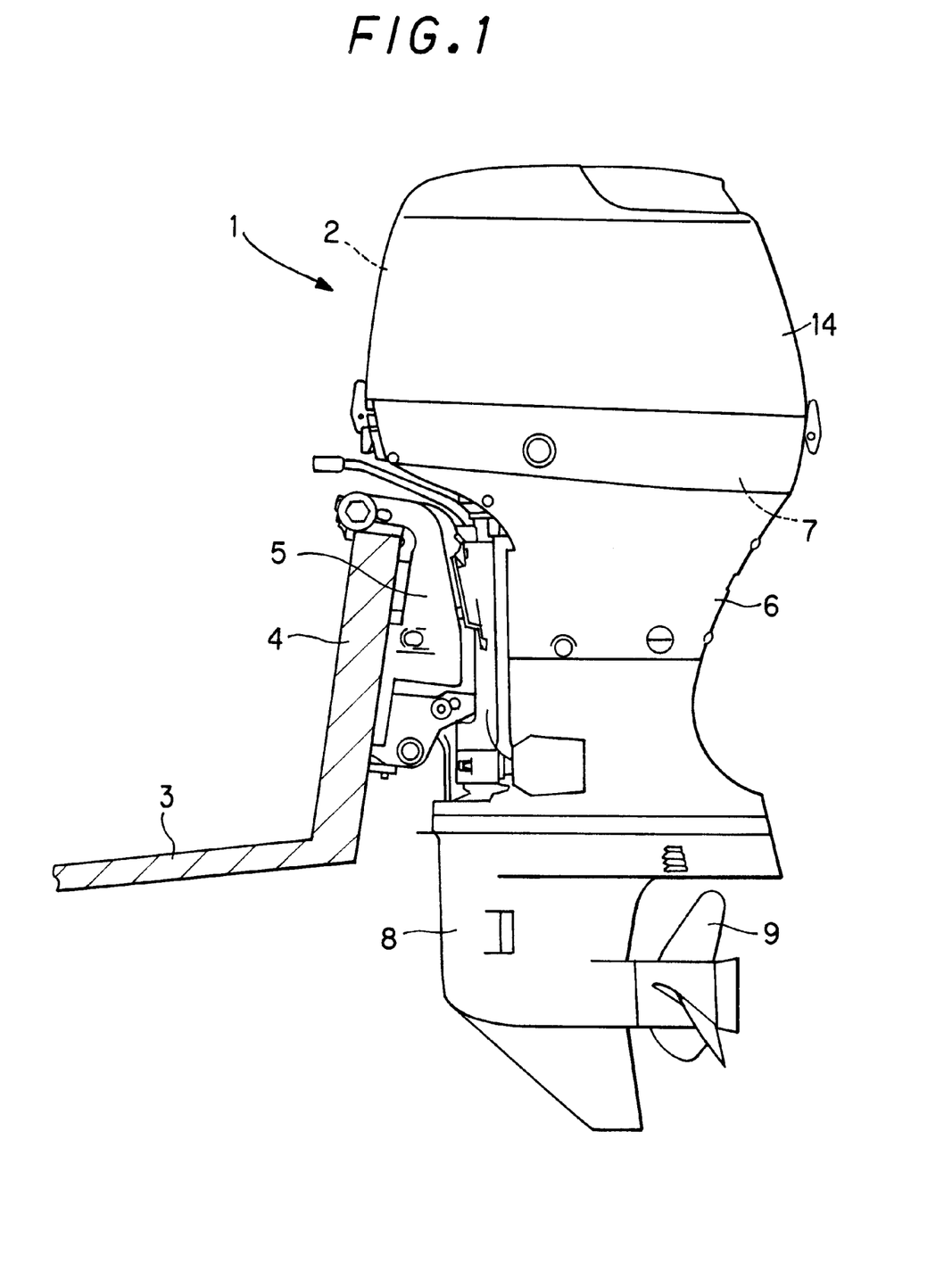
FIG. 1 is an external side view showing an outboard motor in accordance with the embodiment of the present invention.
Figure 2:
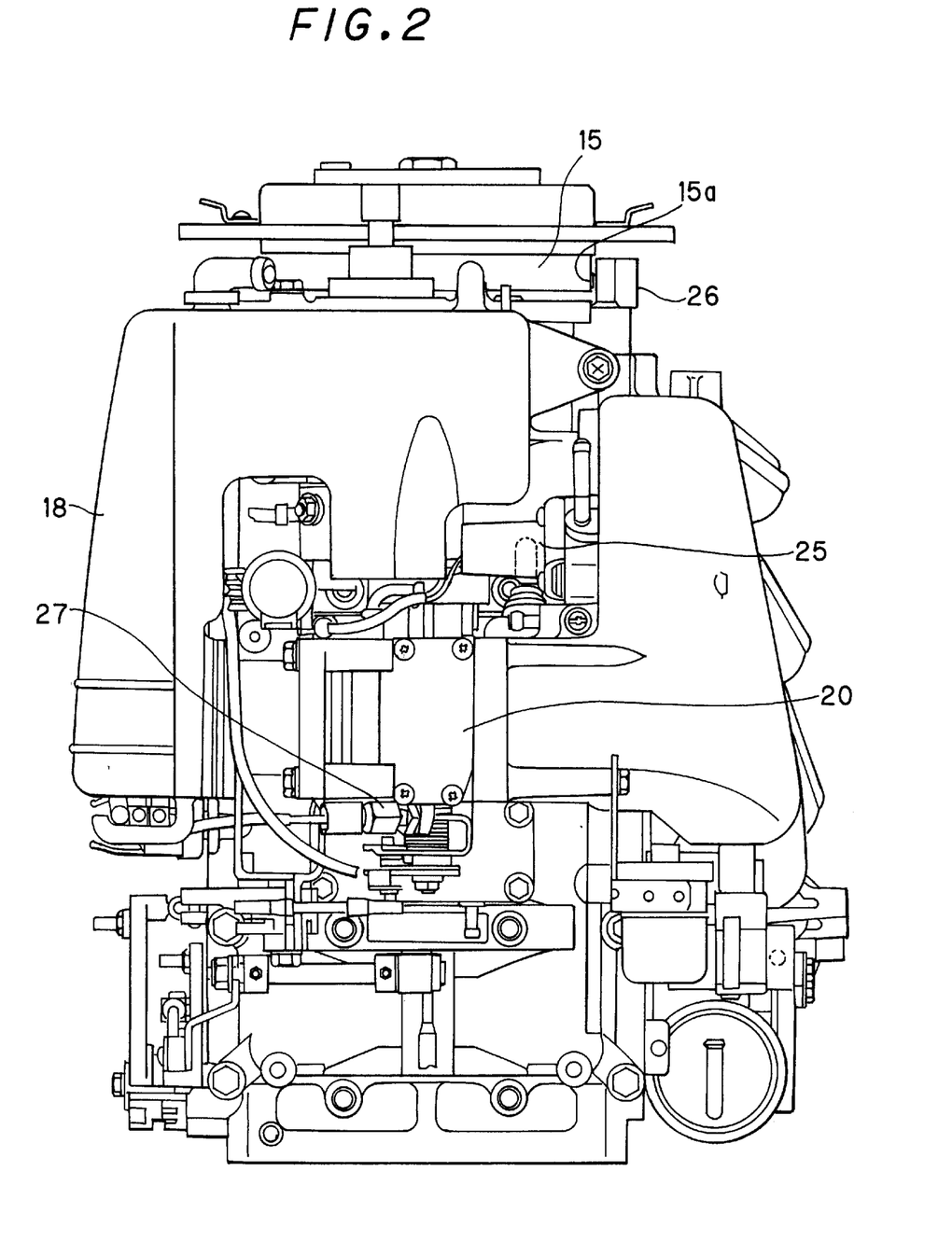
FIG. 2 is a rear-side view showing that shown in FIG. 1.
Figure 3:
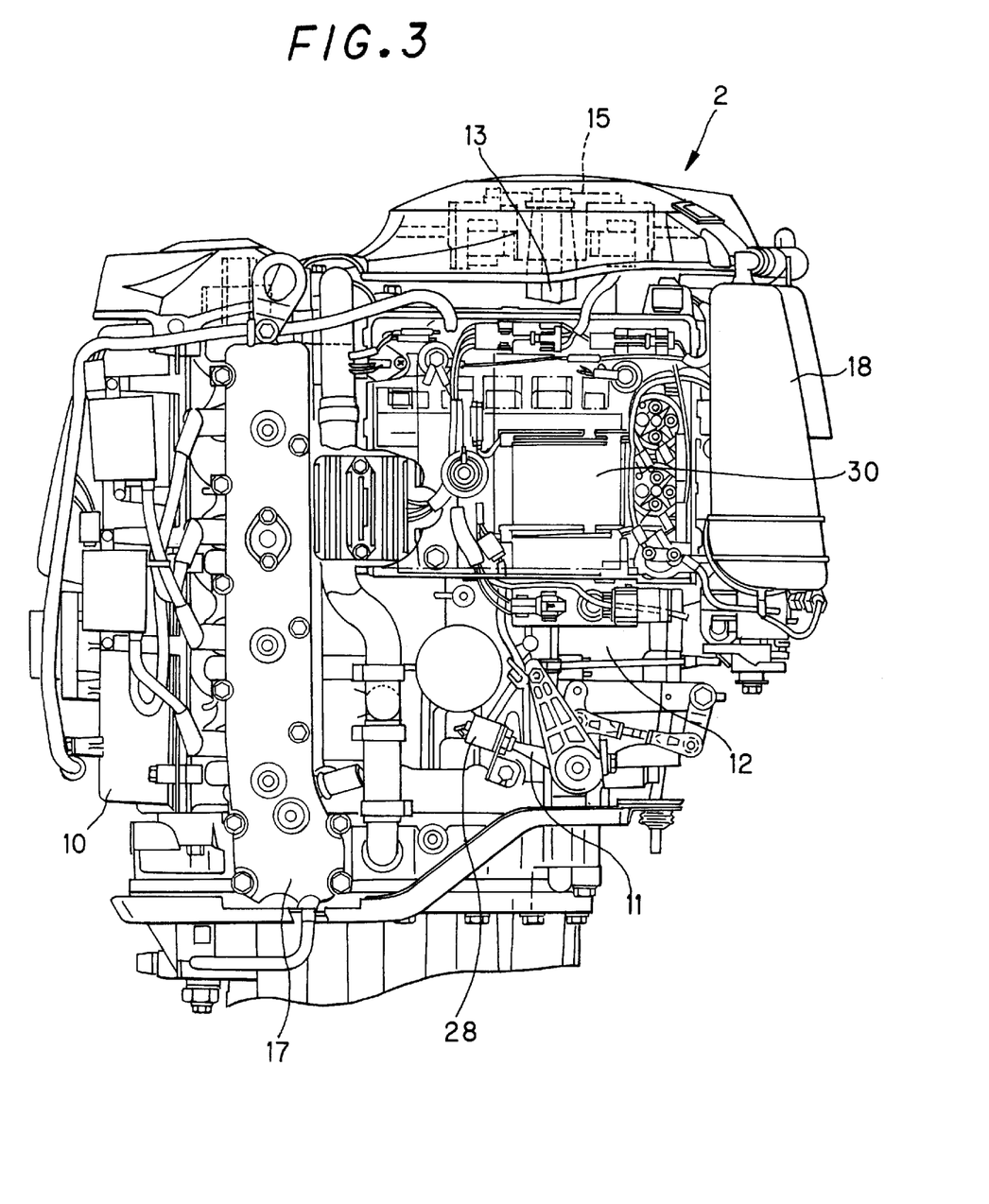
FIG. 3 is a partial cutout plan view of that shown in FIG. 2.
Figure 4:
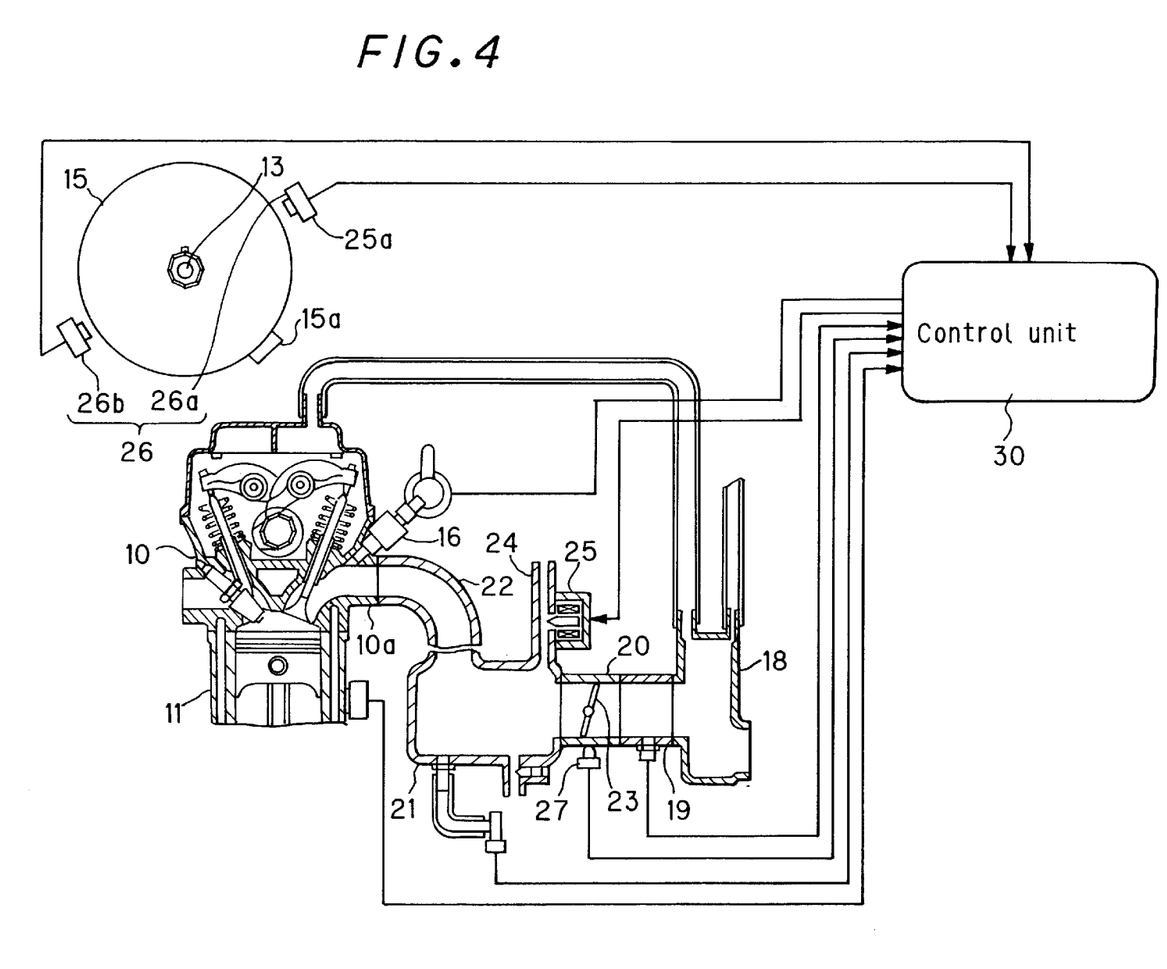
FIG. 4 is a conceptual view for explaining the whole configuration of an outboard motor of the embodiment.
Figure 5:
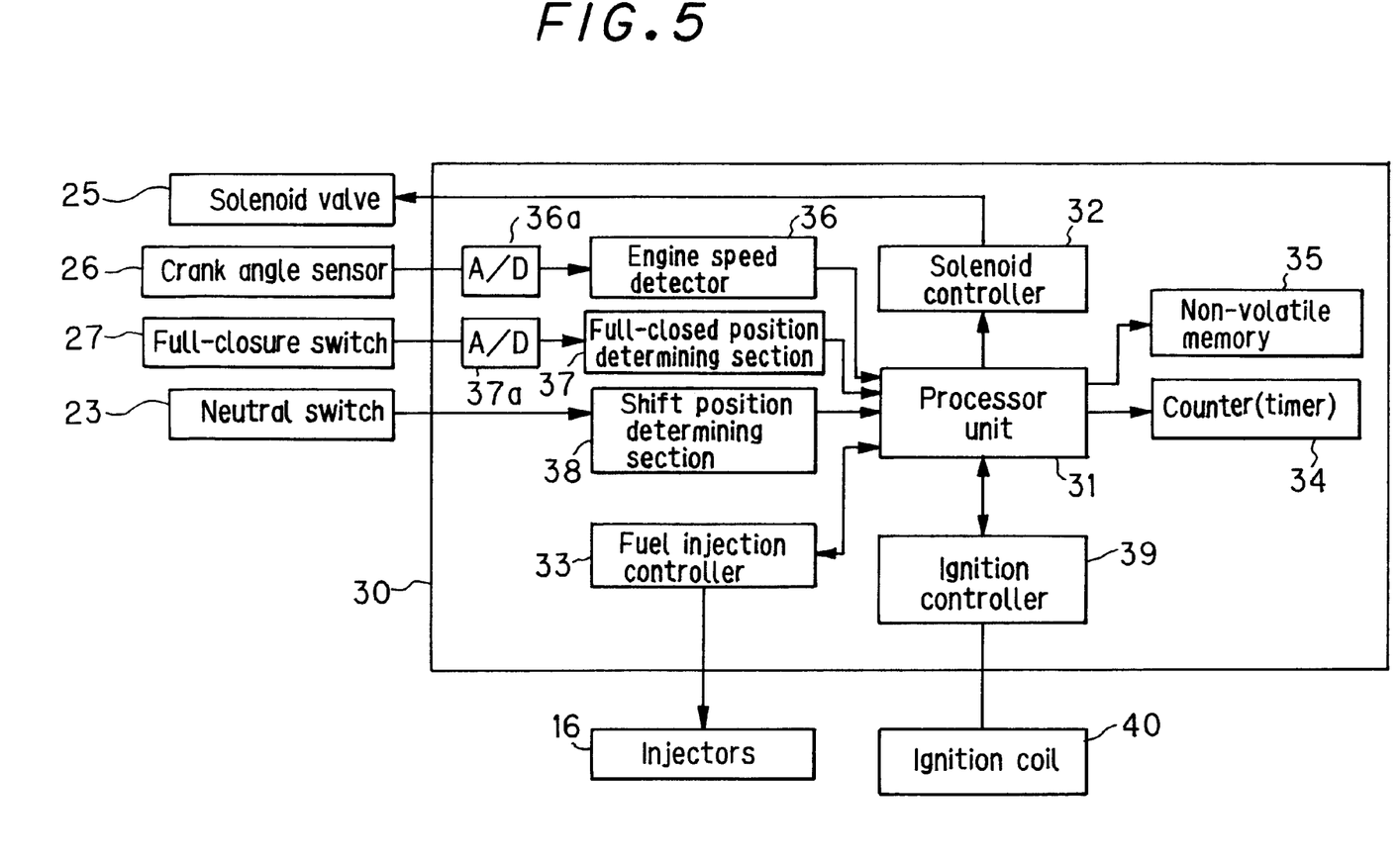
FIG. 5 is a block diagram showing a control unit shown in FIG. 4.
Figure 6:
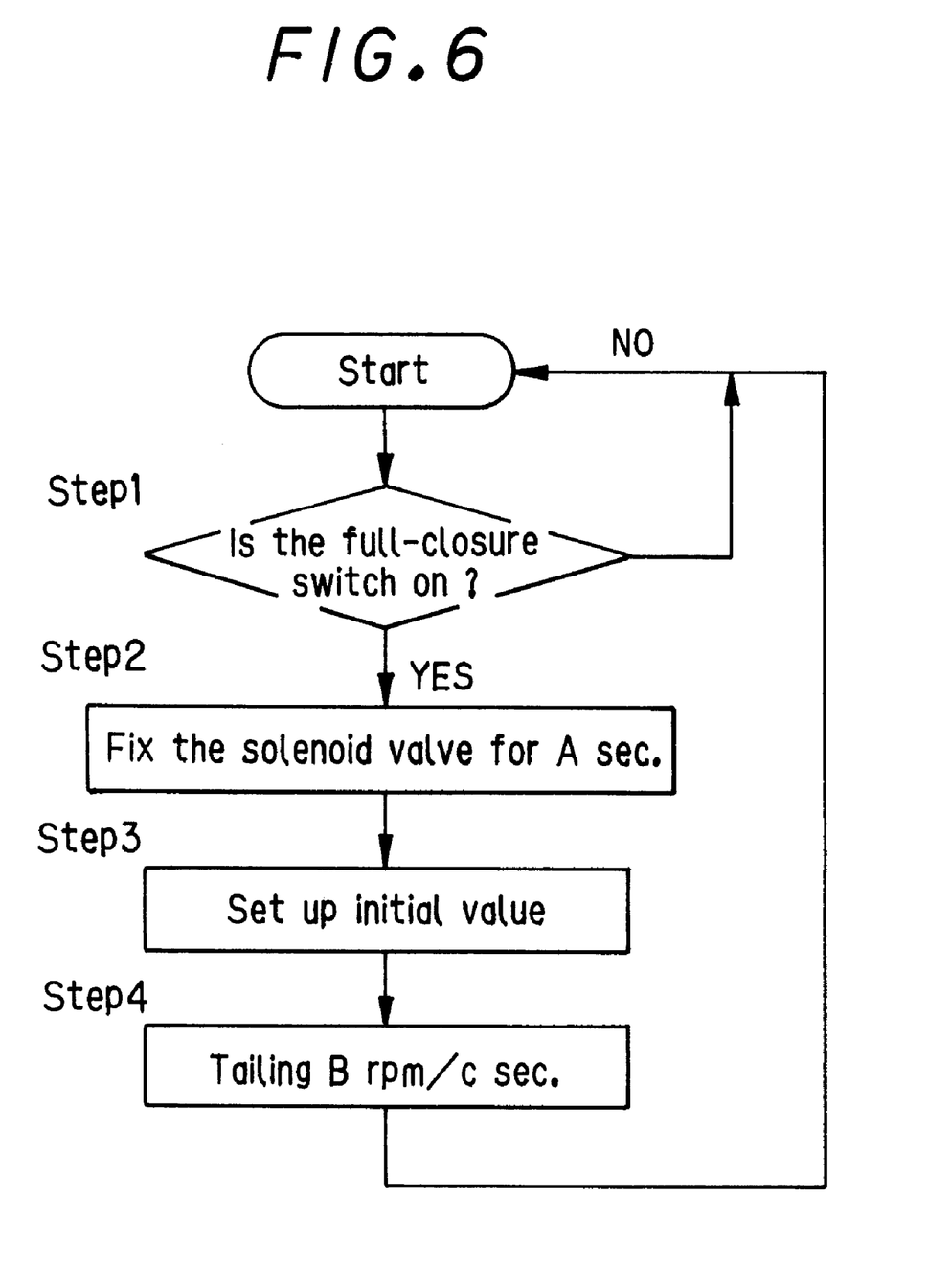
FIG. 6 is a flowchart showing the operation of that shown in FIG. 5.
Figure 7:
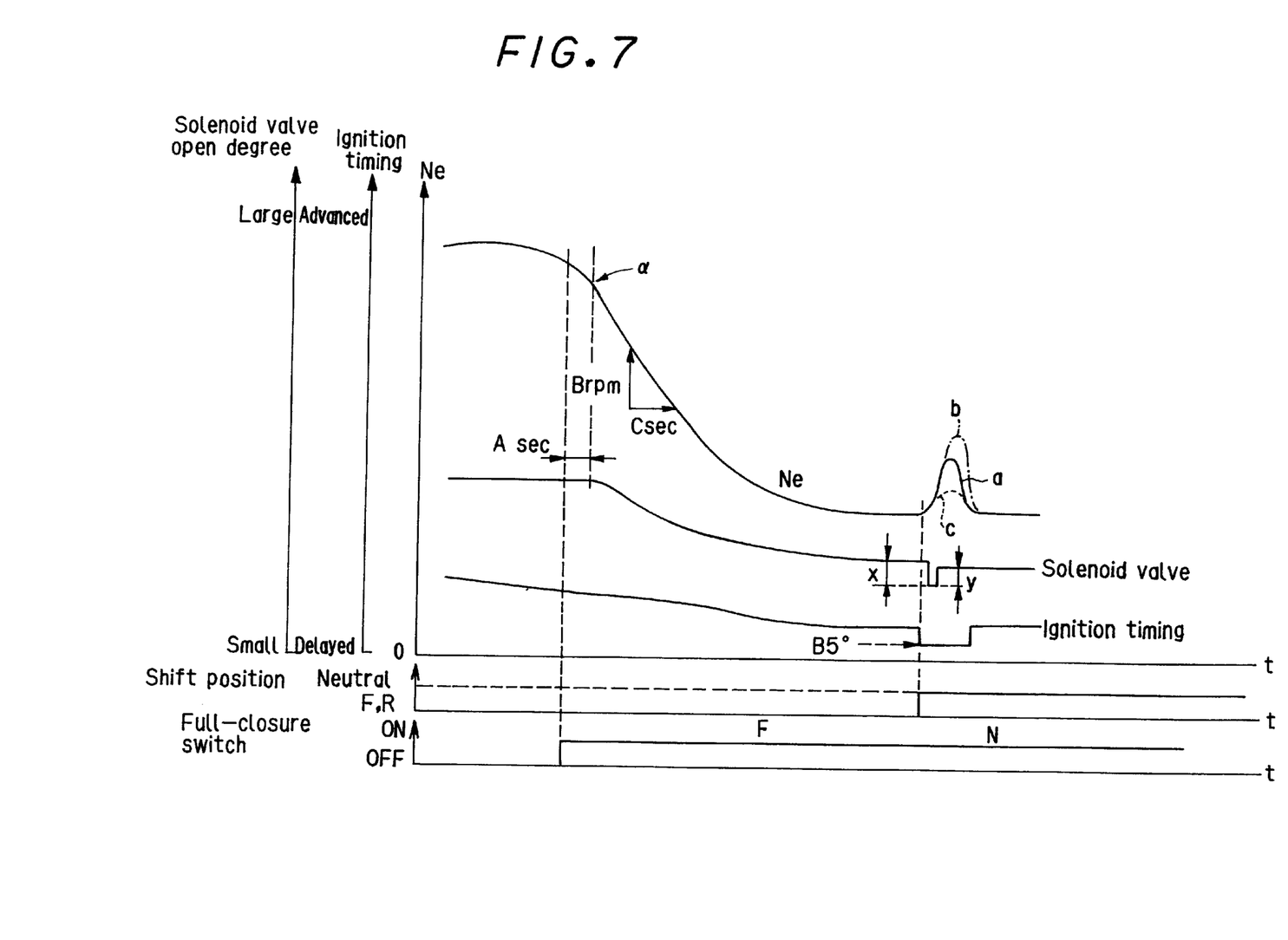
FIG. 7 is a timing chart showing the control operation of that shown in FIG. 5.

FIG. 1 is an external side view showing an outboard motor in accordance with the embodiment of the present invention; FIG. 2 is a rear-side view showing that shown in FIG. 1; FIG. 3 is a partial cutout plan view of that shown in FIG. 2; FIG. 4 is a conceptual view for explaining the whole configuration of an outboard motor of this embodiment; FIG. 5 is a block diagram showing a control unit shown in FIG. 4; FIG. 6 is a flowchart showing the operation of that shown in FIG. 5; and FIG. 7 is a timing chart showing the load variation characteristics of that shown in FIG. 5.

As shown in FIG. 1, an outboard motor 1 used in this embodiment is mounted to a transom 4 of a hull 3 by means of a bracket 5. This outboard motor 1 has a drive shaft housing 6 which extends vertically in the rear of bracket 5 and is of a hollow body having an overall horizontal section of a spindle shape. Formed over drive shaft housing 6 is an engine holder 7, on which an engine 2 covered with an engine cover 14 is mounted. A gear casing 8 is linked under drive shaft housing 6. This gear casing 8 rotatably supports a propeller shaft having a propeller 9 directed horizontally to the rear.

As shown in FIGS. 2 to 4, this engine 2 is of a four cylinder (or of a multiple cylinder), four-stroke engine having a cylinder head 10, a cylinder block 11 and a crankcase 12. In this engine, fuel is injected into cylinder head 10 from an injector 16(see FIG. 4) from an unillustrated fuel tank. A crankshaft 13 is rotatably supported inside crankcase 12 in the approximately vertical direction. A flywheel 15 for an electric generator is fixed on crankshaft 13 and has a flywheel magnet 15a fixed on the peripheral surface thereof.

In the drawings, reference numerals 17 and 18 designate an exhaust manifold for discharging the exhaust from engine 2 and a silencer, respectively.

The air intake passage is made up of silencer 18, a throttle body 20 connected to silencer 18 via a connector pipe 19, a surge tank 21 connected to throttle body 20 and an inlet pipe 22 connecting surge tank 21 and an inlet port 10a of cylinder head 10. A throttle valve 23 is incorporated in throttle body 20 so that the angle of the opening of throttle valve 23 (or the open degree of the throttle) can be controlled by actuation of an unillustrated throttle lever.

One end of an air supply channel 24 having a small section is connected to surge tank 21 that is located downstream of throttle valve 23.

This air supplying channel 24 is provided with a linear solenoid valve 25 (to be referred to simply as a solenoid valve, hereinbelow) as an air control valve for controlling the cross-section (the open degree) of air flowing therethrough. The open degree of air supplying channel 24 is controlled by controlling the open degree of the valve.

Designated at 30 is a control unit, which is connected on its input side to a crank angle sensor 26, a full-closure switch 27, a neutral switch (shift position detecting sensor) 28 (see FIG. 3) and the like and is connected on its output side to injector 16 provided in each cylinder head and solenoid valve 25 as shown in FIGS. 4 and 5, so that injectors 16, solenoid valve 25 and the like are controlled based on the input signals from switch 27 and sensors 26 and 28.

The above crank angle sensor is configured, as shown in FIG. 4, of a pair of magnetic sensors 26a and 26b arranged 180° apart from each other, i.e., at opposite positions, in proximity to the rotational path of flywheel magnet 15a and when flywheel magnet 15a opposes each of magnetic sensors 26a and 26b, a predetermined detection signal is output.

The aforementioned full-closure switch 27 outputs a predetermined full-closure signal when throttle valve 23 is in the fully closed state.

The aforementioned neutral switch 28 outputs a predetermined detection signal when the running state of the vessel, that is, the shift position designating forward, neutral or reverse is set to the neutral position.

Control unit 30 has a configuration shown in FIG. 5. That is, control unit 30 includes: a solenoid controller 32 for controlling the operation of solenoid valve 25; a fuel injection controller 33 for controlling the operation of injectors 16; and ignition controller 39 for controlling ignition coils 40 and controls these by a processor unit 31. This processor unit 31 is connected with a counter 34 as the time measuring means for measuring time and a non-volatile memory 35 for storing the predetermined data and the like. Processor unit 31 and solenoid controller 32 constitute a controlling means. Processor unit 31 also functions as an initial value setting means for performing the operation of initial value setup, which will be described later.

The input side of processor unit 31 is connected to an engine speed detector (engine speed detecting means) 36 which detects the engine speed (the rotating speed of the crankshaft) based on the detection signal from crank angle sensor 26, digitally converted through an A/D converter 36a; a fully closed position determining section 37 which determines whether solenoid valve 25 is in the fully closed position based on the detection signal from full-closure switch 27, digitally converted through an A/D converter 37a; and a shift position determining section (shift position determining means) 38 which determines the currently set, shift position based on the detection signal etc. from neutral switch (shift position detecting means) 23. Based on the signals output from these sections, solenoid controller 32, fuel injection controller 33, ignition controller 39 and the like are controlled.

The aforementioned neutral switch 23 also serves as a neutral switch used for neutral interlock, to reduce the cost.

Next, the operation will be described.

In this embodiment, when the throttle is shut down abruptly while the outboard motor is running, the control operation as shown in FIGS. 6 and 7 is performed in order to prevent the engine from sharply lowering its speed and thereby stalling.

Illustratively, as the engine starts to be driven by the activation of the power source, fully closed position determining section 37 of control unit 30 judges whether the full-closure signal that indicates the fully closed state has been output from full-closure switch 27(Step 1). This judgement is output to processor unit 31. If the judgment is that the full-closure switch is in the fully closed state, processor unit 31 which has received the judgement, controls solenoid controller 32 so as to fix the open degree of solenoid valve 25 for 'A seconds '(Step 2). This fixing of the open degree can prevent sharp lowering of the engine speed even when solenoid valve 25 is abruptly switched into the fully closed state. In this case, if this fixed time 'A seconds' is longer than necessary, the reduction of the engine speed is so slow that the feeling of control may also degrade. Therefore, this time needs to be set appropriately.

When counter 34 for time measurement has counted up to A seconds (see FIG. 7) from the fixture of the opening, processor unit 31 sets up an initial engine speed $\alpha$ (see FIG. 7) at which the control of the opening of solenoid valve 25 is started (Step 3). This initial value $\alpha$ is the upper limit in the control of the open degree of solenoid valve 25. In this embodiment, if the engine speed when the fixing of the open degree of solenoid valve 25 is completed, is equal to or above 1200 rpm, the initial value $\alpha$ is set at 1200 rpm. If the engine speed when the fixing of the open degree of solenoid valve 25 is completed, is lower than 1200 rpm, the engine speed is directly set up as the initial value.

Thereafter, as shown in FIG. 7, processor unit 31 controls solenoid controller 32 so as to slowly tail the engine speed from the previously set initial value $\alpha$ to the target engine speed for the fully closed state by using the predetermined ratio (B rpm/C sec) (Step 4). Thus, the sharp reduction of the engine speed and hence engine stalling can be prevented.

In this embodiment, since the engine speed is gradually tailed in the range from the initial value α to the target engine speed, it is possible to gain a uniform, stabilized feeling of the engine speed lowering, regardless of the external conditions. Furthermore, since the upper limit of the initial value α for starting the tailing is set at a relative low value, 1200 rpm as stated above, a moderate tailing effect can be obtained whilst ensuring the engine speed is not reduced too slowly. It is also possible to avoid shift changes at high engine speeds, and realize a comfortable shifting operation. This also leads to avoidance of lowering of the durability of the shift mechanism due to gear-shifting.

The reduction rate (B rpm/C sec) in engine speed in the tailing can be kept constant from the initial value α to the target engine speed, but it can be varied stepwise with the passage of time. This embodiment is a configuration in which the reduction rate is varied stepwise.

As stated above, in accordance with this embodiment, it is possible to realize an inexpensive and efficient dashpot function using a solenoid valve which has been used conventionally in adjustment and control of engine idling speed, without the necessity of using any extra special parts or any expensive parts.

Also, there has been a problem of producing operator uncomfortableness due to increase in engine speed in the unloaded condition when the shift mechanism is changed from forward to neutral. In the present embodiment, in order to eliminate this drawback, retard control on spark timing is carried out as shown in FIG. 7 when the shift mechanism is set in neutral.

Specifically, when shift position determining section 38 determines that the shift mechanism has been changed from forward to neutral, based on the output from neutral switch 23, processor unit 31 controls ignition controller 39 to delay ignition timing in each ignition coil. By this control, the engine speed will change as shown by a solid line 'a' in FIG. 7, thus markedly reducing the engine speed as compared to the case where no ignition timing control is carried out (that shown by chained line 'b' in FIG. 7), leading to an enhanced comfortableness during operation.

The engine speed at which retard control is started needs to be set outside the engine speed range of idling and trolling. Here, the lower limit is set at 1000 rpm.

The set ignition timing needs to be set at a value equal to or below that of idling and trolling, as indicated by B5° in FIG. 7.

Further, in this embodiment, the solenoid valve is controlled in addition to the control of ignition timing, whereby the increase in engine speed when the shift mechanism is changed into neutral can be suppressed.

Illustratively, when judging that the shift mechanism has been shifted to the neutral position, processor unit 31 controls solenoid controller 32 so that the valve opening of solenoid valve 25 is temporarily closed by x° and then opened by y°. The parallel execution of this solenoid valve control and the ignition timing control further suppresses the increase in engine speed as indicated by a broken line 'c' in FIG. 7, thus achieving a further improved comfortableness during operation.

In the above description of the embodiment, a linear solenoid valve is used as an air control valve, but a duty solenoid valve may be used instead.

As has been described heretofore, in accordance with the first feature of the invention, when the operator abruptly closes the throttle, the valve opening of the air control valve is fixed and then the engine speed is gradually lowered from a predetermined initial value to the target engine speed by the predetermined rate over time. Therefore, it is possible to reliably suppress sharp lowering of the engine speed and hence prevent the engine from stalling. This feature is effective in simplifying the engine running control and markedly contributes to improvement of sailing comfortableness.

Since the air control valve is adapted to be controlled within the range from the initial value to the target engine speed, it is possible to effect stable control regardless of external conditions. Further, since the engine speed quickly lowers up to the initial value, there is no possibility of the engine speed lowering too slowly. Moreover, since the engine speed will not be increased greater than necessary, no strong force is needed for the shifting operation, which leads to a comfortable shifting operation as well as a high durability of the shift mechanism.

What is claimed is:

1. An engine running control apparatus for an outboard motor comprising: an engine as a rotational driving source of a propeller shaft; a throttle valve disposed in an air intake passage connected to the engine; an air supplying channel disposed upstream of the throttle valve for supplying air to the air intake passage; and an air control valve for controlling air from the air supplying channel, wherein the engine speed is controlled by controlling air supplied from the air supplying channel by means of the air control valve, the engine running control apparatus comprising:

a full-closure state detecting means for outputting a full-closure detection signal when the throttle valve is in the fully closed state;

a control means for control the open degree of the air control valve;

a time-measuring means for counting up a predetermined period of time in response to the full-closure detection signal;

an engine speed detecting means for detecting the rotating speed of the engine; and an initial value setting means for setting up an engine speed at which control of the degree of the opening is started by the control means, in response to the full-closure detection signal, characterized in that the control means, in response to the reception of the full-closure detecting signal, fixes the degree of the opening of the air control valve until the time-measuring means counts up to a predetermined period of time, and controls the opening of the air control valve after the elapse of the predetermined time so that the engine speed will be reduced at a predetermined rate over time.

2. The engine running control apparatus for an outboard motor according to claim 1, wherein the control means controls the degree of the opening of the air control valve so as to keep the reduction in engine speed per unit time constant.

3. The engine running control apparatus for an outboard motor according to claim 1, wherein the control means controls the degree of the opening of the air control valve so as to change the reduction in engine speed per unit time stepwise.

* * * * *